United States Patent
Arai et al.

[11] Patent Number: 5,952,571
[45] Date of Patent: Sep. 14, 1999

[54] THERMAL TYPE FLOW METER

[75] Inventors: Nobukatsu Arai, Ushiku; Takehiko Kowatari, Kashiwa; Kaoru Uchiyama, Oomiya-machi; Izumi Watanabe, Hitachinaka; Shinya Igarashi, Naka-machi, all of Japan

[73] Assignees: Hitachi, Ltd., Tokyo; Hitachi Car Engineering Co., Ltd., Ibaraki, both of Japan

[21] Appl. No.: 08/934,758

[22] Filed: Sep. 22, 1997

[30] Foreign Application Priority Data

Sep. 20, 1996 [JP] Japan .................................. 8-249736

[51] Int. Cl.$^6$ ........................................................ G01F 1/68
[52] U.S. Cl. .......................................... 73/204.11; 73/118.2
[58] Field of Search ............................. 73/118.2, 204.11, 73/204.15, 204.26, 204.27

[56] References Cited

U.S. PATENT DOCUMENTS

| | | |
|---|---|---|
| 5,224,378 | 7/1993 | Yajima et al. . |
| 5,392,646 | 2/1995 | Yajima ................................. 73/204.19 |
| 5,419,187 | 5/1995 | Uchiyama ............................... 73/118.2 |
| 5,623,097 | 4/1997 | Horiguchi et al. .................. 73/204.15 |

FOREIGN PATENT DOCUMENTS

| | | |
|---|---|---|
| 0536880A1 | 8/1992 | European Pat. Off. . |
| 3103178A1 | 1/1981 | Germany . |
| 6-267711 | 9/1994 | Japan . |
| 7-229777 | 8/1995 | Japan . |

*Primary Examiner*—Harshad Patel
*Attorney, Agent, or Firm*—Antonelli, Terry, Stout & Kraus, LLP

[57] ABSTRACT

In a thermal type flow meter having a temperature compensating bridge circuit, the temperature compensating bridge circuit includes a heating resistor, a temperature compensating resistor and a plurality of resistors each having a fixed resistance. The heating resistor and the temperature compensating resistor are supported by a support member in an air flow passage, and the support member is formed by a material having a small temperature coefficient $\Delta\lambda$ of thermal conductivity between −0.06 and 0.06 w/m·k$^2$. The absolute value of the output error of the flow meter is reduced as a result of variation of the flow quantity or flow velocity of intake air and the intake air temperature.

7 Claims, 9 Drawing Sheets

Qt:TOTAL HEAT VALUE,
Ql:HEAT TRANSMISSION QUANTITY TO LEAD,
Qa:RADIATION QUANTITY TO AIR (BOBBIN PART)
{(80):TEMPERATURE OF INTAKE AIR=80°C HOUR,
(25):TEMPERATURE OF INTAKE AIR=25°C HOUR }

Qt:TOTAL HEAT VALUE,
Ql:HEAT TRANSMISSION QUANTITY TO LEAD,
Qa:RADIATION QUANTITY TO AIR (BOBIBIN PART)
{(80):TEMPERATURE OF INTAKE AIR=80°C HOUR,
(25):TEMPERATURE OF INTAKE AIR=25°C HOUR }

| NAME OF MATERIAL | TEPPERATURE (K) | THERMAL CONDUCTIVITY λ (W/m·K) | TEPPERATURE COEFFICIENT OF THERMAL CONDUCTIVITY Δλ (W/(m·K2)) |
|---|---|---|---|
| PLATINUM-IRIDIUM(PtIr(10)) | 273<br>373 | 30.08<br>37.6 | 0.068 |
| TITANIUM(Ti) | 300<br>600 | 21.9<br>19.4 | -0.0083 |
| TANTALUM(Ta) | 300<br>1000 | 57.5<br>60.2 | 0.014 |
| GIRUCONIUM(Zr) | 300<br>1000 | 22.7<br>23.7 | 0.0014 |
| MARTENSITIC STANLESS STEEL (0.13C-12.95Cr-0,14Ni) | 300<br>500 | 26.9<br>27.6 | 0.0035 |
| AUSTENITIC STANLESS STEEL SUS304 (18Cr-8Ni) | 300<br>600 | 16.0<br>19.0 | 0.01 |
| 9%Cr-Mo STEEL (0.12C-9Cr-1Mo) | 300<br>500 | 26.1<br>26.9 | 0.004 |
| PALLADIUM (pd) ALLOY pd(70)-Ir(15)-Pt(15) | 273<br>373 | 17.2<br>19.5 | 0.0288 |

THERMAL TYPE FLOW METER

BACKGROUND OF THE INVENTION

The present invention relates to a thermal type flow meter, and more particularly, the invention relates to a thermal type flow meter which is suitable to detect a quantity of intake air in an engine for automobiles, and to a measurement element for the flow meter.

In an engine for automobiles, it is required to operate with stability at temperatures within extremely wide range. Generally, the range of temperatures is from −30° C. to +80° C. Accordingly, in a thermal type flow meter for an engine, it is essential to be able to measure air flow with accuracy within the above-mentioned range of temperatures.

However, as is well-known, the physical value of air vary according to the air temperature. Therefore, in the constant temperature type hot wire wind gauge, an error occurs with a variation of the temperature of the intake air. In such a flow meter, because the flow quantity or an output can be converted into a value proportional to the measured flow velocity, the flow velocity or the wind speed also can be obtained as a measure of a flow quantity or a wind quantity.

Figure 10:
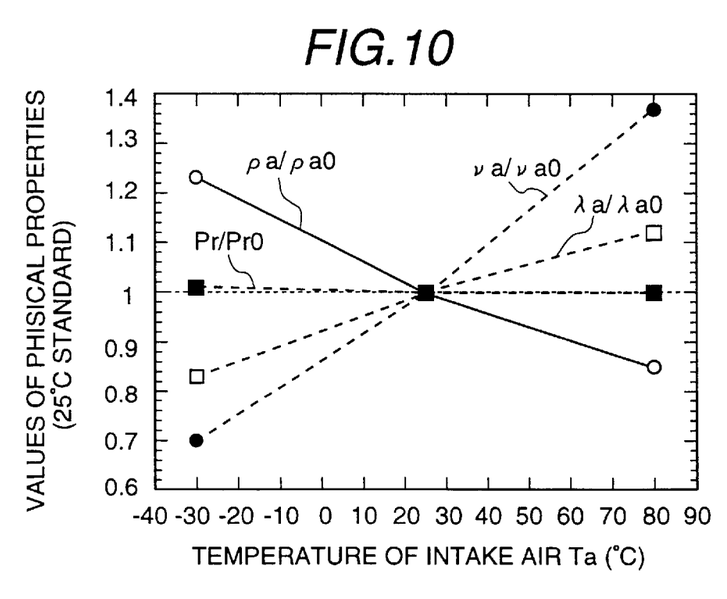
FIG. 10 is a numerical value graph showing variation the air physical properties corresponding to a variation of the temperatures.
Figure 11:
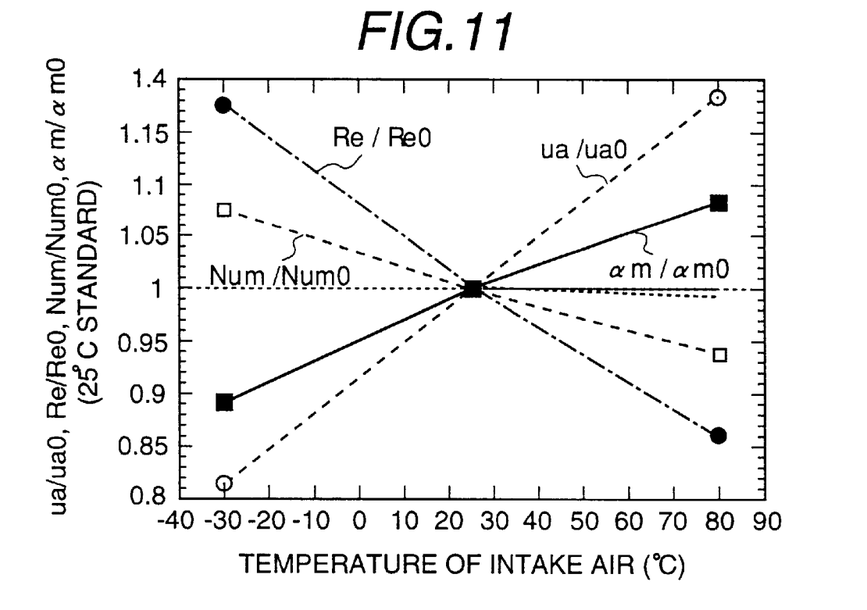
FIG. 11 is a numerical value graph showing variation flow velocity, a non-dimensional number and thermal conductivity corresponding to the variation of physical properties of air which correspond to a variation of temperature.

The variation of the physical properties of air corresponding to a variation of temperatures within the above-mentioned temperature range is shown in FIGS. 10 and 11. FIG. 10 is a numerical value graph showing the variation of various physical properties of air corresponding to a variation of the temperatures. FIG. 11 is a numerical value graph showing the variation of flow velocity, a non-dimensional number and thermal conductivity corresponding to a variation of various physical properties of air which correspond to a variation of temperatures. For example, if the physical properties at 25° C. (designated by a final letter O), which is a center value of the above temperature range, is set as a standard value or reference value, the density σa of air, the coefficient νa of kinematic viscosity, the heat conductivity λa and the Prandtl number Pr vary as shown in FIG. 10. As a result, the flow velocity ua, the Reynolds number Re, the average Nusselt's number Num and the average heat-transfer coefficient αm vary as shown in FIG. 11.

The average heat-transfer coefficient αm, which has an effect on the final measurement, becomes larger as the air temperature increases, and it becomes smeller as the air temperature decreases. Basically, the variation of the average heat-transfer coefficient causes a variation of the quantity of heat-radiation from the heating resistor and the support member for it, namely, a variation of the total heating quantity of the thermal type flow meter. This causes an error of the thermal type flow meter due to the variation of the temperature of the intake air. In general, this error is compensated by providing an approximately constant heating extent (over-temperature ΔTe against the intake air temperature) by using a bridge circuit, or an electronic circuit having a function equivalent to a bridge circuit, connected to the flow meter, so that the temperature The of the heating resistor or the electrical resistance Rh may vary according to the intake air temperature.

Japanese Patent Laid-Open No. 55-50121 (1980) discloses a technique in which the temperature of a heating resistor is varied according to the detected intake air temperature, in order to solve the above-mentioned problem. Namely, it states that by detecting the intake air temperature, using a temperature compensating resistor, and providing approximately constant heating or the over-temperature ΔTe to the heating resistor for detecting the flow velocity by using a bridge circuit, this error can be eliminated.

Further, Japanese Patent Laid-Open No. 5-312612 (1993) points out that the Japanese Patent Laid-Open No. 55-50121 does not consider compensation of the loss of heat radiation and that of heat-transfer to the support portion of the heating element. In order to compensate mainly the loss of heat radiation, the equipment disclosed in Japanese Patent Laid-Open No. 5-312612 is so constructed that a second measurement element, in addition to first measurement element, is arranged in a fluid passage, and the second measurement element may be heated more than the temperature of the first measurement element in a low flow velocity range when the temperature of the fluid is high.

Further, Japanese Patent Laid-Open No. 4-285818 (1992) discloses a technique in which the flow quantity in a wide range can be accurately detected by setting the value of the temperature coefficient of the electrical resistance of a temperature compensating resistor Rc to a value lower than that of the temperature coefficient of the electrical resistance of a heating resistor Rh.

Japanese Patent Laid-Open No. 5-52626 (1993) discloses a technique in which high responsibility and high adhesive strength of a lead wire can be obtained by joining lead wires, having a core wire consisting of a material having a heat conductivity lower than that of platinum coated with an alloy layer of which the main component is platinum, for example, 40 Ni—Fe alloy or SUS 430, to a heating resistor having a body which is formed by a bobbin type ceramics.

Figure 9:
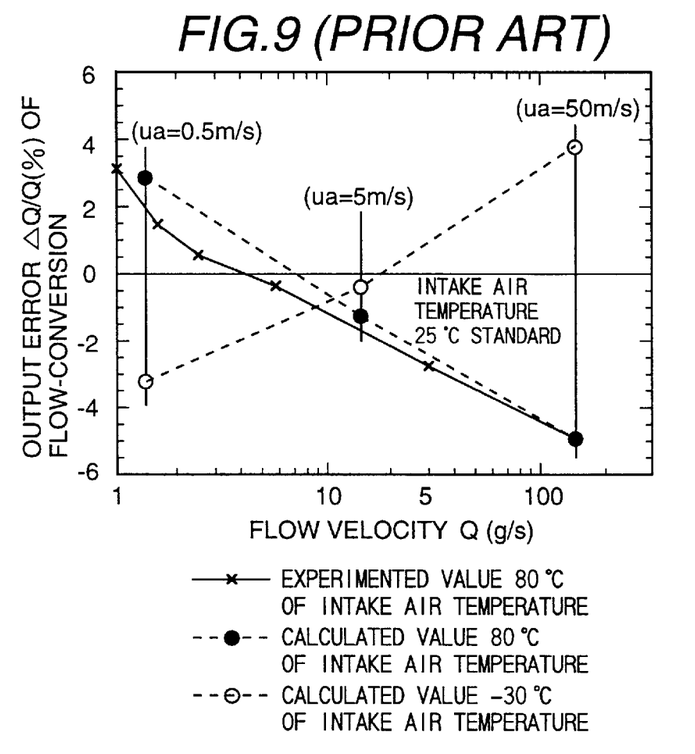
FIG. 9 is a numerical value graph showing variation of an error of an output of the flow conversion according to a variation of the flow velocity at different intake air temperatures in the conventional thermal type flow meter.

While, in the prior art disclosed in Japanese Patent Laid-Open No. 55-50121, the component of the variation of the heat transfer quantity due to a compulsive convection current is compensated with respect to temperature, no consideration is given to the fact that the variation of the characteristics of the heat transfer of the flow meter, including the heating resistor and its lead, must be compensated. Even if the adjustment for eliminating an error, for example, at an intermediate and arbitrary flow velocity or flow quantity, is performed, the error becomes large in a measurement range apart from the adjusted values (due to the fluctuation of the characteristics of the heat transfer of the heating resistor in accordance with the flow velocity or the flow quantity). This is concretely shown in FIG. 9, which is a numerical value graph showing a variation of error in an output of the flow conversion according to a variation of the flow velocity at different intake air temperatures in the conventional thermal type flow meter. As designated by a solid wire representing the result of measurement in FIG. 9, when the intake air temperature varies from 25° C. to 80° C., there is a problem that a plus error occurs at the low flow side and a minus error occurs at the high flow side.

Further, the technique disclosed in Japanese Patent Laid-Open No. 5-312612, which can solve the problem of the approach taken in Japanese Patent Laid-Open No. 55-50121, has the problem that the hardware becomes complicated. According to the inventors' study, the main cause of a variation of the error due to the flow velocity or the flow quantity is not based on the variation of loss of the heat radiation, but is caused by the variation of loss of the heat transfer to the support member for the heating element shown in the Japanese Patent Laid-Open No. 5-312612. It is, therefore, impossible to sufficiently compensate the output error against a variation of the flow velocity due to a variation of the heat transfer to the support member for the heating element by using the above-mentioned construction. The reason for this will be explained hereinafter.

Figure 8:
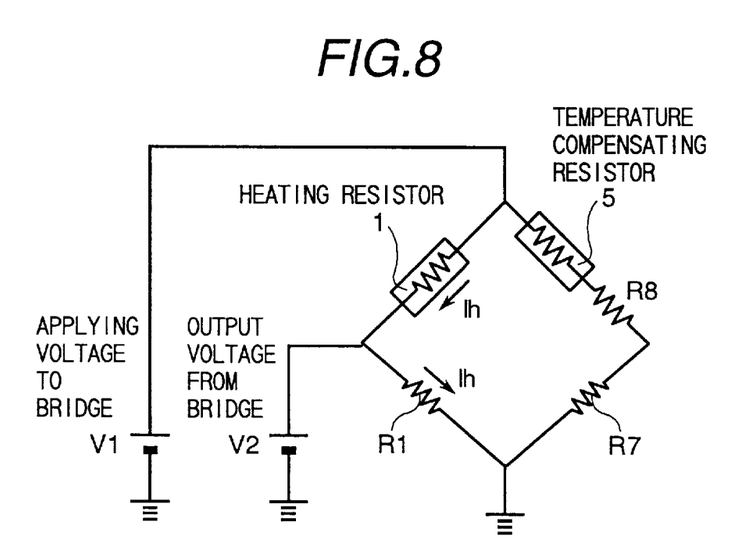
FIG. 8 is a schematic circuit diagram of a temperature compensating circuit in a conventional thermal type flow meter.
Figure 12:
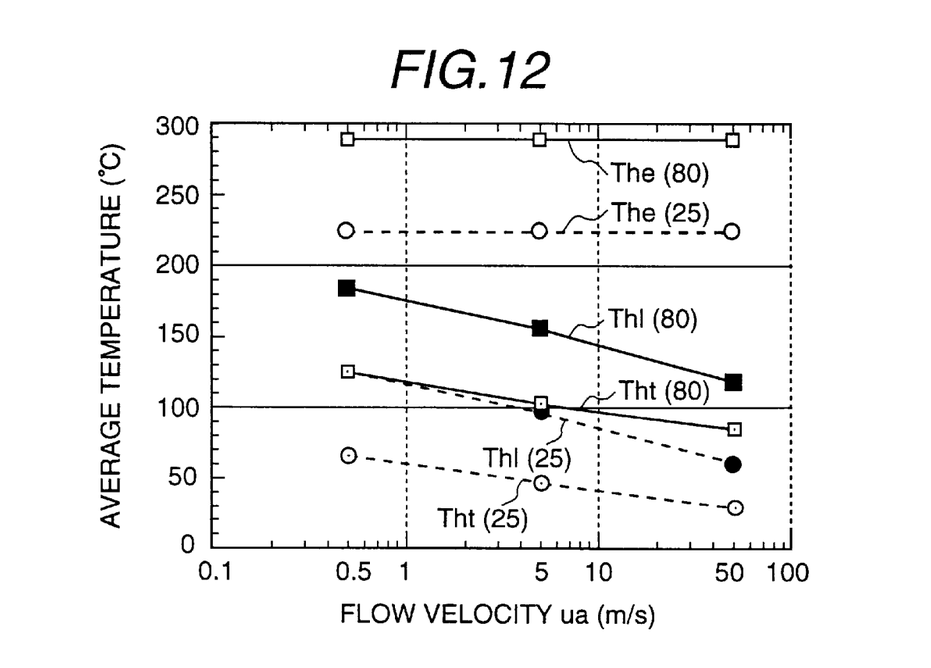
FIG. 12 is a graph which shows variation of the temperature The of the heating resistor, the temperature of the lead and the temperature of the terminal at a standard intake air temperature 25° C. and at an intake air temperature 80° C.
Figure 13:
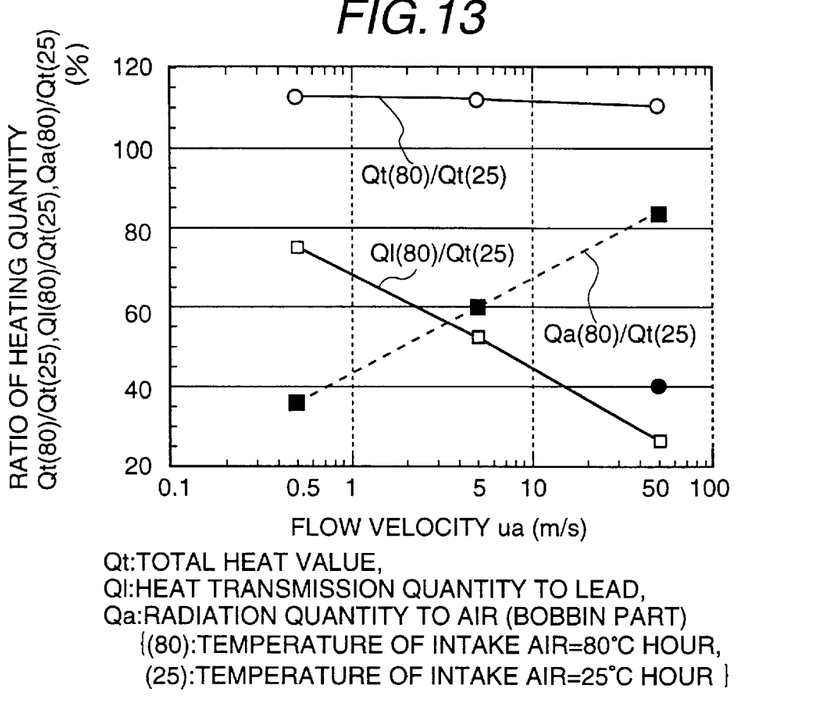
FIG. 13 is a graph which shows variation of the ratio of the total heating quantity at an intake air temperature 80° C., the radiation quantity to the air in an element body and the heat transfer quantity to the lead to the total heating quantity of the flow meter at a standard intake air temperature 25° C., resulting from variation of the flow velocity.

FIG. 8 shows a temperature compensating circuit in the conventional thermal type flow meter. For example, for the conventional thermal type flow meter, in order to compensate the temperature of the heating resistor by using a bridge circuit as shown in FIG. 8, consideration is given to the variation of the temperature The of the heating resistor, the temperature Thl of the lead and the temperature Tht of the terminal at the standard temperature of 25° C. of the intake air and at a temperature of 80° C., as shown in FIG. 12. Further, the variation of the ratio of the total heating quantity Qt (80) at an intake air temperature of 80° C., the ratio of the radiation quantity Qa (80) to the air in an element body and the ratio of the heat transfer quantity Q1 (80) to the lead to the total heating quantity of the flow meter at a standard intake air temperature of 25° C., which occur due to the variation of the flow velocity, is shown in FIG. 13.

As shown in FIG. 12, while the temperature The of the heating resistor is approximately constant at 25° C. and 80° C. with respect to the flow velocity, the temperature Thl of the lead and the temperature Tht of the terminal becomes high as the flow velocity becomes low. Further, it is seen from FIG. 13 that Qa(80)/Qt(25) increases as the flow velocity increases, that Q1(80)/Qt(25) decreases as the flow velocity increases. The sum Qt(80)/Qt(25) is relatively large at the side of the low flow velocity. This small inclination finally causes a plus error at a low flow and a minus error at a high flow. This is because the inclination of the variation Q1(80)/Qt(25) of the heat transfer to the lead wire is larger by a little than the inclination of the variation Qa(80)/Qt(25) of the radiation quantity from the element body.

Figure 14:
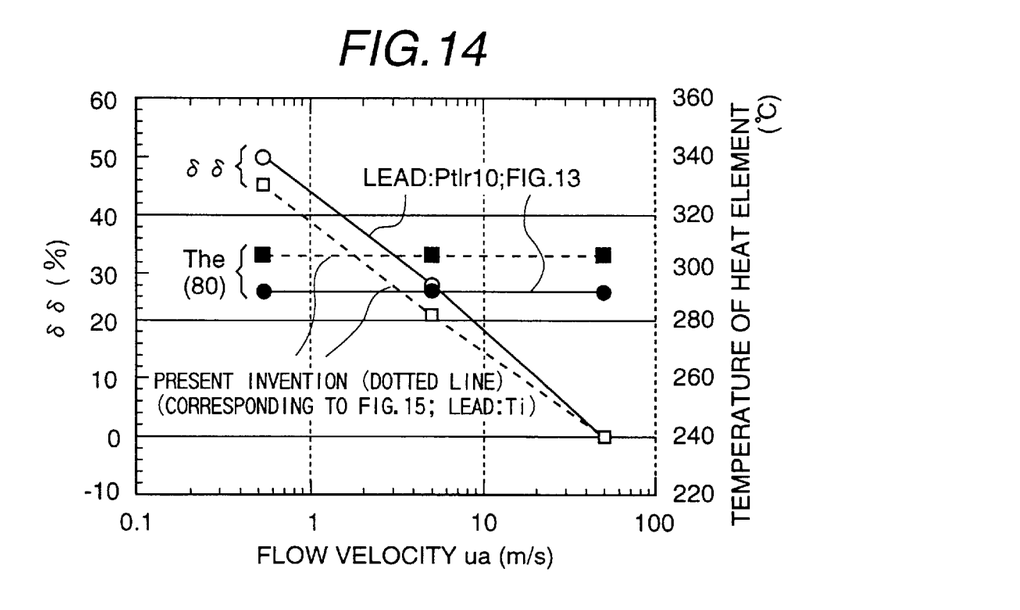
FIG. 14 is a numerical value graph showing variation of difference between the ratio of the heating quantity at different intake air temperatures and variation of the temperature of the heating element in a conventional thermal type flow meter.

This fact is clearly seen from FIG. 14, which is a numerical value graph showing a variation of the difference between the ratio of the heating quantity at different intake air temperatures and a variation of the temperature of the heating element in the conventional thermal type flow meter. FIG. 14 shows the variation of the difference δδ between the ratio Q1(80)/Qt(25) of the heat transfer quantity Q1(80) to the lead at an intake air temperature of 80° C. and the total heating quantity Qt(25) at an intake air temperature of 25° C at a flow velocity of 50 m/s, and the ratio Q1(80)/Qt(25) at a low velocity, caused by the variation of the flow velocity. The solid wire designates an example of the conventional thermal type flow meter, in which the value δδ at a flow velocity of 0.5 m/s is more than 50% of the value at a flow velocity of 50 m/s.

The operation of the apparatus disclosed in the Japanese Patent Laid-Open No. 4-28581 is basically the same as that of the Japanese Patent Laid-Open No. 55-50121. Therefore, there is the problem that the variation of the inclination of the error which occurs due to the variation of the flow velocity under different conditions of temperature is not eliminated, even if temperature compensation is performed at a certain flow. In this reference, as means for varying the coefficient of temperature of the electrical resistance by using the temperature compensating resistor and the heating resistor, there is provided means for changing the thickness of a metal film or the condition of heat treatment. However, such a means is not practical when taking the variations which occur in production into consideration.

Further, in the technique disclosed in the Japanese Patent Laid-Open No. 5-52626, the heat transfer from the heating resistor to the lead member is decreased by lowering the thermal conductivity to the lead member. Namely, the improvement of the variation of the thermal conductivity at the lead which causes the variation of the measurement error variation due to the variation of the flow velocity in the flow meter is not considered.

Recently, there has been an increased need to suppress the direct or indirect effect of the harmful components included in exhaust gas emitted from an automobile, to reduce their effect on the environment. In the United States, it is a policy and a requirement in some jurisdictions that the maximum reference value of the emission amount of NOx, out of the harmful components CO, HC and NOx included in the exhaust gas emitted from an engine for an automobile, must be decreased to one half at present, and then to one third by the year 2000. Similarly, taking the future of the world petroleum supply into consideration, it is a policy that the maximum reference value of the percentage of fuel consumption must be decreased to one half after the year 2000. The above-mentioned harmful components and the fuel consumption is extremely effected by the air/fuel ratio, which is the mixture of the air and the fuel burned in an automobile engine. Accordingly, it is necessary to control air/fuel ratio more accurately than ever in the operation of an automobile engine, and this makes it necessary to improve the accuracy of the flow measurement which directly determines the adjustment of the air/fuel ratio. Particularly, in conjunction with the use of catalyst to decrease the above-mentioned harmful components, the air/fuel ratio is controlled in the neighborhood of the value 1, because the invert ratio sharply varies from approximately 100% after and before the value of the air/fuel ratio. Therefore, in order to satisfy the above-mentioned reference, it is necessary to decrease the current measurement error to one half or one third.

SUMMARY OF THE INVENTION

An object of the present invention is to provide a thermal type flow meter which can be realized at a low cost and in which the output error due to variation of the flow quantity or flow velocity and the intake air temperature is significantly reduced.

Another object of the present invention is to provide a thermal type flow meter which can provide control of an engine to obtain advantageous output characteristics in order to improve the fuel consumption of the engine at high temperatures and the starting characteristic of the engine at low temperatures and to decrease the harmful components included in the exhaust gas emitted by the engine.

In order to solve the above-mentioned problems and achieve the stated objects, a thermal type flow meter according to the present invention comprises the following components, namely, a first electric resistor for detecting fluid flow, formed on a ceramic or glass substrate, and a second electric resistor having a resistance value which depends on a measured fluid temperature provided within the fluid by a support member extending from a plastic member supporting an electric conductor connected to an electric circuit comprising several constant electric resistors forming a bridge circuit and connecting to said first and second electric resistors, whereby a temperature compensation corresponding to variation of the measured fluid temperature is effected by heating said first electric resistor in accordance with the measured fluid temperature detected by said second electric resistor.

$$\delta = 1 - \sqrt{(Qt0/Qt)(Rh/Rh0)}$$

In accordance with this invention, the value δ determined by the above relationship based on the total heat value Qt0 and the value Rh0 of electric resistance of said first electric resistor at a predetermined temperature or reference temperature and the total heat value Qt and the value Rh of electric resistance of said first electric resistor at the measured fluid temperature is set within the range of −0.003 to 0.003 at measured fluid temperatures between −30° C. and 80° C. Preferably, the value δ is within the range of −0.0015 to 0.0015. More particularly, the value δ is within the range of −0.001 to 0.001.

The support member includes a lead and a terminal, and the lead is formed by a material having a temperature coefficient Δλ of thermal conductivity between −0.06 and 0.06 W/m·K². Preferably, the temperature coefficient Δλ is between −0.03 and 0.03 W/m·K². More preferably, the temperature coefficient Δλ is between −0.02 and 0.02 W/m·K².

Further, the support member is formed by an alloy including as a component platinum or palladium, or by titanium, tantalum, or zirconium or an alloy including one of them, or by stainless steel or Cr—Mo steel. At least one portion of the surface of said support member is coated with an anti-oxidation film, platinum, platinum alloy, palladium or palladium alloy.

In order to attain another object of the present invention, the value of δ indicates a negative inclination with respect to the variation of the measured fluid temperature.

PREFERRED EMBODIMENTS OF THE PRESENT INVENTION

Figure 1:
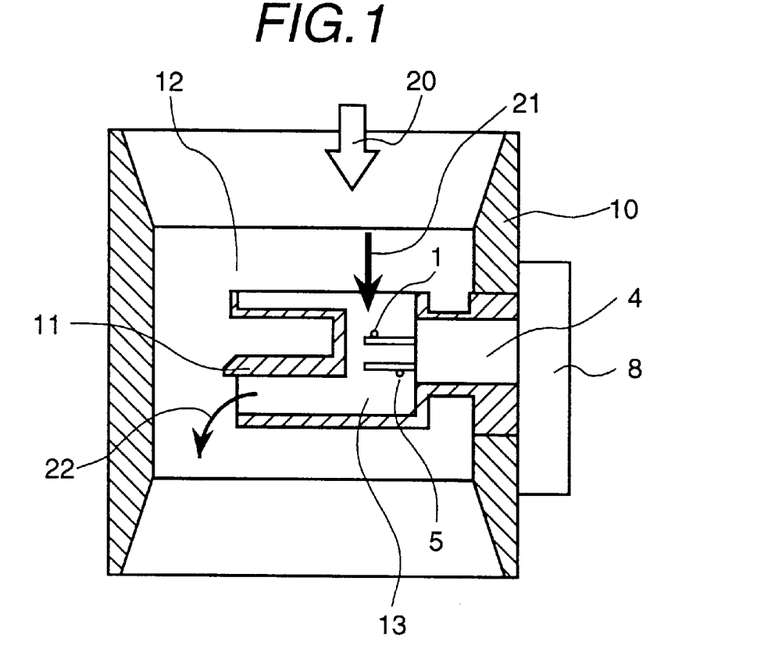
FIG. 1 is a longitudinal sectional view showing the overall configuration of an embodiment of a thermal type flow meter according to the present invention.
Figure 2:
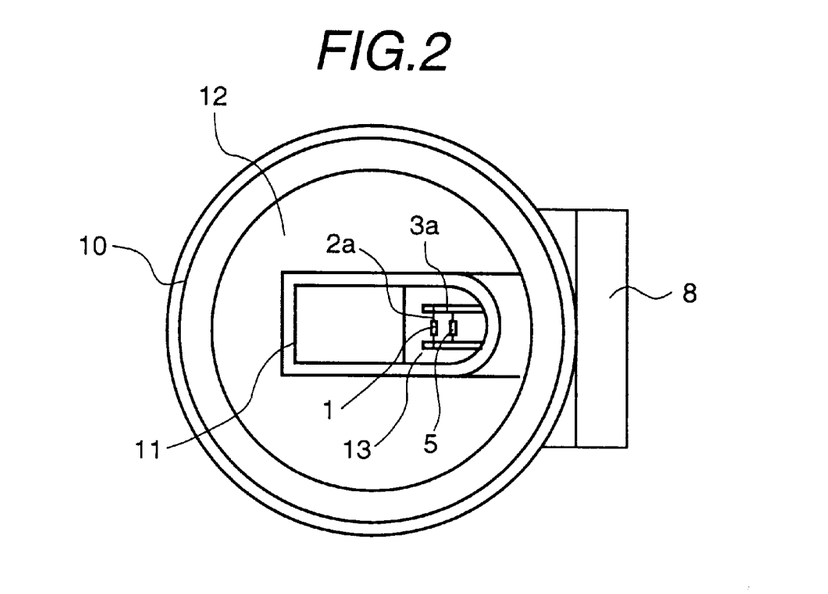
FIG. 2 is a top end view showing the interior configuration of the thermal type flow meter according to the present invention.

Various embodiments of the present invention will be explained hereinafter with reference to FIGS. 1 to 8, FIGS. 14 to 17 and Table 1. FIGS. 1 and 2 show the overall configuration of an embodiment of a thermal type flow meter according to the present invention. Reference numeral 10 designates a body on which a thermal type flow meter according to the present invention is mounted, and which forms a portion of an intake air passage. A main flow passage 12 is provided inside the body 10, through which the air flow passes, and a member 11 is provided inside the main flow passage 12 for supporting a heating resistor 1 and a temperature compensating resistor 5. A sub-flow passage 13 is provided inside the member 11, and the air flow passing through the sub-flow passage 13 is measured by the heating resistor 1 and the temperature compensating resistor 5. The heating resistor 1 and the temperature compensating resistor 5 are fixed on a molded plastic member 4 so as to be provided in a passage, which is parallel with the main air flow, in the sub-flow passage 13. These resistors are supported via a terminal 3a and a lead wire 2a. An air flow 21 is branched to the sub-flow passage 13 and an outlet flow 22 exits from the sub-flow passage.

Figure 3:
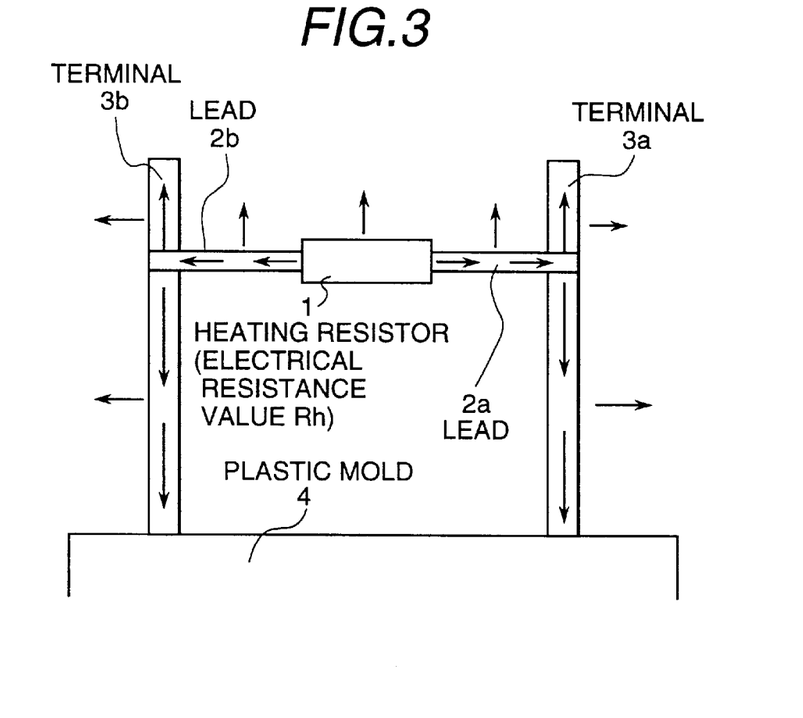
FIG. 3 is a diagrammatic cross section showing the main portion of the thermal type flow meter according to the present invention.

FIG. 3 is a diagram showing the main portion of the thermal type flow meter according to the present invention. Arrows in FIG. 3 designate a flow direction of heat. The heating resistor 1 is supported in the fluid passage by the lead wires 2a, 2b and the terminals 3a, 3b connected to the lead wires. The terminal 3a, 3b are connected to the molded plastic member 4 which carries an electrical conductor extending to a circuit module (not shown). The above-mentioned components form a main portion of the thermal type flow meter.

Figure 16:
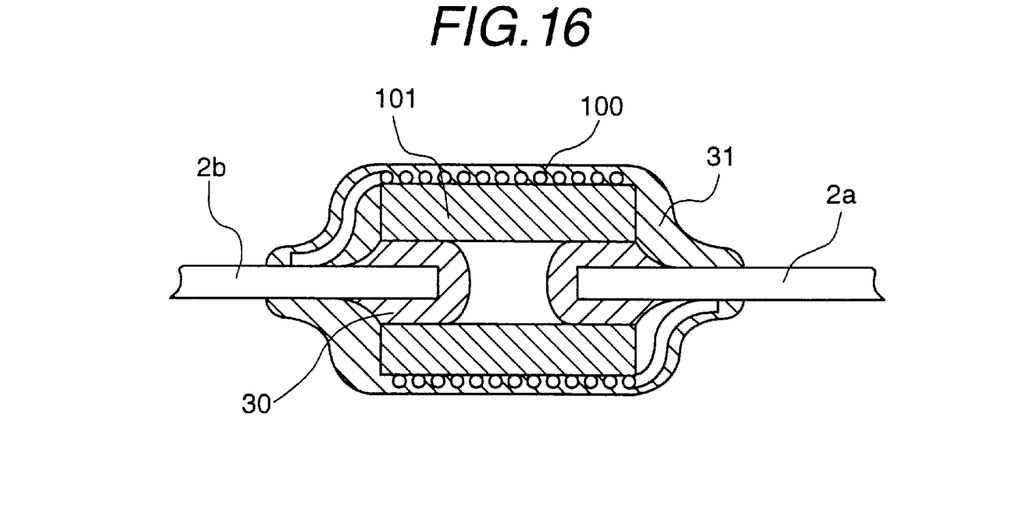
FIG. 16 is a vertical cross section showing in detail an example of the configuration of the heating resistor 1 used in the thermal type flow meter shown in FIG. 1.

The configuration of the heating resistor 1 will be explained with reference to FIG. 16. FIG. 16 is a vertical cross section showing in detail an example of the configuration of the heating resistor 1 used in the thermal type flow meter shown in FIG. 1. As shown in the figure, a platinum wire of small radius is wound around the outer surface of a bobbin-shaped basic body 101 formed by using aluminum, etc. The ends of the platinum wire are welded to the respective metal leads 2a, 2b inserted into holes formed in the basic body 101 and fixed in the holes of the basic body 101 by adhesive 30, such as glass adhesive. The leads are formed by using titanium, tantalum, a stainless alloy, or an alloy including platinum or palladium as a component, of which the amount of variation of thermal conductivity due to the temperature is small as compared with platinum iridium, which has been used conventionally. Further, the whole body is over-coated with glass 31.

Figure 7:
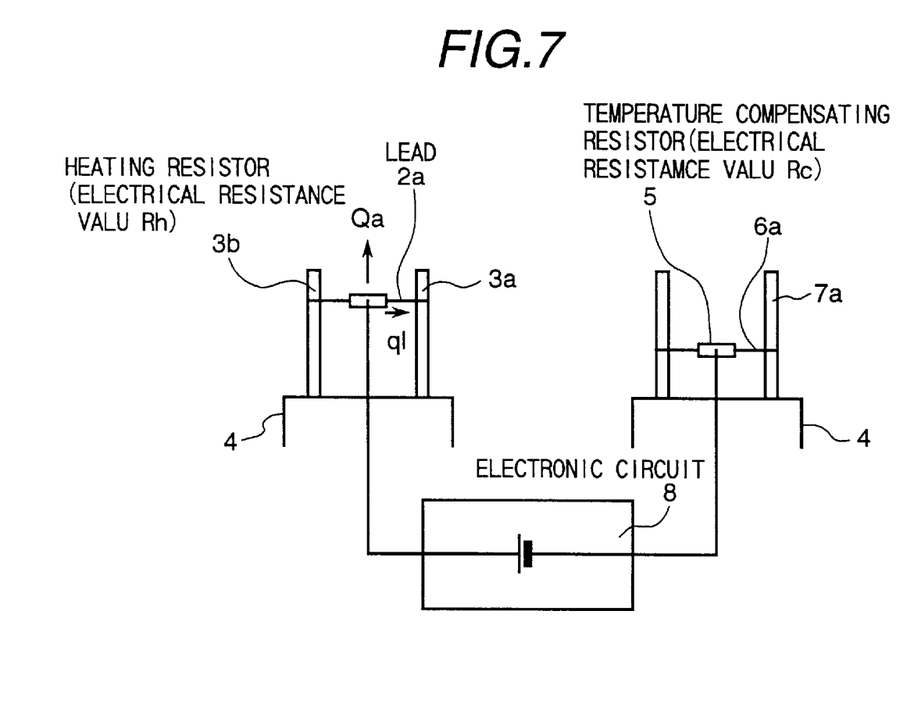
FIG. 7 is a diagram which shows the concept of the temperature compensation in the thermal type flow meters of the present invention and the prior art.

FIG. 7 shows the concept of the temperature compensation in the thermal type flow meter according to the present invention and in the prior art. In FIG. 7, reference numeral 5 designates a temperature compensating resistor for measuring the intake air temperature. Reference numeral 6a designates a lead wire for the temperature compensating resistor, and 7a designates a terminal for the temperature compensating resistor. Reference numeral 8 designates an electronic circuit connected to the heating resistor 1 and the temperature compensating resistor 5, for determining a current to compensate the measurement error of the flow velocity being measured by using the heating resistor 1 along with those resistors. The temperature The of the heating resistor 1 is controlled by adding a predetermined heat temperature ΔTe to the temperature Tce detected by the temperature compensating resistor, using the electronic circuit 8. The electronic circuit 8 is actually more complicated, that is, it is basically constructed from a bridge circuit including the heating resistor 1 and the temperature compensating resistor 5, as shown in FIG. 8.

The basic concept and technical idea of the present invention resides in maintaining the variation of the heat transfer quantity Q1 from the element body to the support member, such as the lead wire and terminal, due to variation of the temperature Thl of the lead wire and the temperature Tht of the terminal caused by the flow velocity, to a small value, which variation is the cause of the error in measurement of the flow velocity, which can not be compensated by the conventional intake air temperature compensation. In an embodiment of the present invention, a material having a small temperature coefficient Δλ of thermal conductivity λ is used. Preferably, a material having a small temperature coefficient Δλ of thermal conductivity λ may be used also for the terminal.

In more detail, a material having a Δλ is between −0.06 and 0.06 W/m·K$^2$ is used. Preferably, a material having a temperature coefficient Δλ between −0.03 and 0.03 W/m·K$^2$ is used. More preferably, a material having a temperature coefficient Δλ is between −0.02 and 0.02 W/m·K$^2$ is used. Concretely, it is possible to use a stainless member as the terminal and titanium of which the temperature coefficient Δλ equals −0.0083 W/m·K$^2$ or tantalum of which the temperature coefficient Δλ equals +0.004 W/m·K$^2$. Further, it is also possible to use a binary alloy including the components of a noble metal, such as platinum or palladium.

By using the above material for the support member, the following value δ

$$\delta = 1 - \sqrt{(Qt0/Qt)(Rh/Rh0)}$$

is within the range of −0.003 to 0.003 at measured fluid temperatures between −30° C. and 80° C. Preferably, the value δ is within the range of −0.0015 to 0.0015. More preferably, the value δ is within the range of −0.001 to 0.001.

Figure 4:
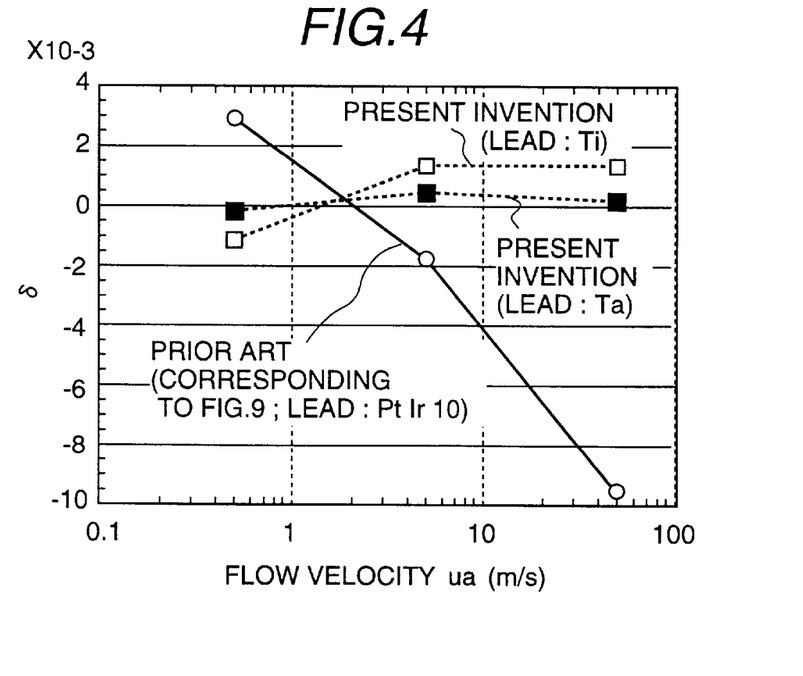
FIG. 4 is a numerical value graph showing a comparison of characteristics of the flow velocity and the output in the thermal type flow meter of the present invention and the prior art.
Figure 5:
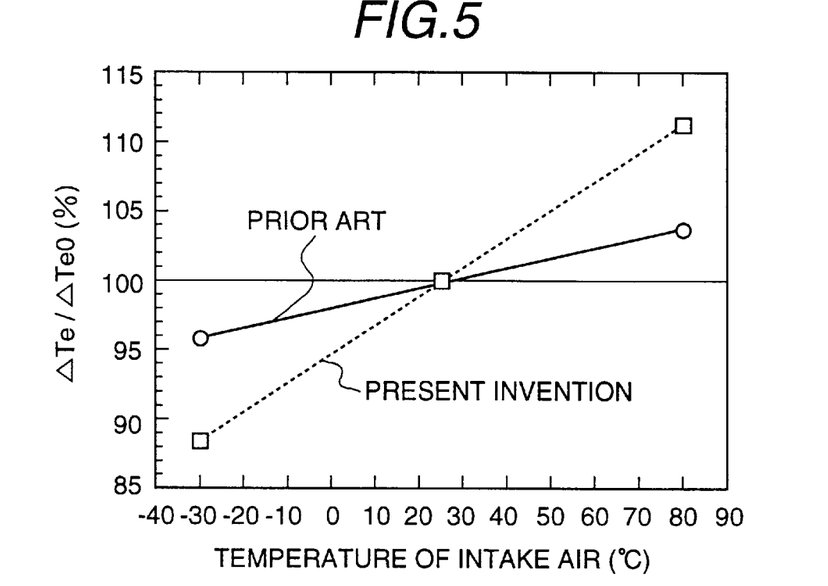
FIG. 5 is a numerical value graph showing a comparison of characteristics of the intake air temperature and the extent of heating in the thermal type flow meter of FIG. 1 and the prior art.
Figure 6:
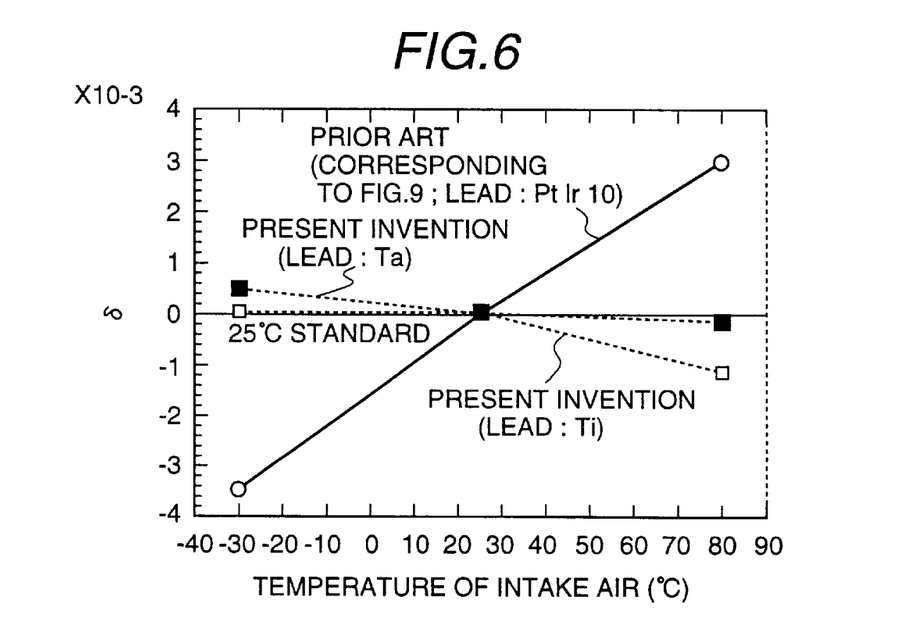
FIG. 6 is a numerical value graph showing a comparison of characteristics of the intake air temperature and the output in the thermal type flow meter of FIG. 1 and the prior art.

The effect obtained by using such a configuration will be explained by using various values with reference to FIG. 4 to FIG. 6. FIG. 4 is a numerical value graph showing a comparison of characteristics of the flow velocity and the output in the thermal type flow meter of the present invention and the prior art. FIG. 5 is a numerical value graph showing a comparison of characteristics of the intake air temperature and the extent of heating in the thermal type flow meter of FIG. 1 and the prior art. FIG. 6 is a numerical value graph showing a comparison of characteristics of the intake air temperature and the output in the thermal type flow meter of FIG. 1 and the prior art.

As shown in FIG. 4, also in the range of the flow velocity from 0.5 m/s to 50 m/s, $$\delta = 1 - \sqrt{(Qt0/Qt)(Rh/Rh0)} \tag{1}$$

it is possible to suppress the value δ to the range of ±0.002 against an increase of the intake air temperature of 55° C. to 60° C. Here, the extent of heating provided by the electronic circuit 8 shown in FIG. 6 has a variation greater than ±0.2%/°C. in the range of an intake air temperature of −30° C. to 80° C. with respect to the extent of heating ΔTe0 at the standard temperature Ta0 (25° C.), as shown by the dotted wire of FIG. 5. In particular, as shown by the dotted wire of FIG. 4, it is possible to suppress the value Δto the range of ±0.0015 in the range of an intake air temperature of −30° C. to 80° C. and at a low flow in which small variation of the value δ provides a large error to the output.

The operation and effect obtained by using the thermal type flow meter constructed as described above will be explained. Firstly, the operation of the bridge circuit shown in FIG. 8 will be explained. The whole heating quantity Qt of the heating resistor 1 is determined by the equation Qt=Rh×Ih2, where Rh is an electrical resistor and Ih is a current passing through the electrical resistor. Therefore, Ih is represented as follows, by using an output voltage V2 of the bridge circuit.

$$Ih = \sqrt{(Qt/Rh)} = V2/R1 \tag{2}$$

An output of the thermal type flow meter is obtained by amplifying the output voltage V2. Therefore, assuming that a standard output is V20 and the current obtained at this time is Ih0, the output error can be represented by the following equation.

$$\delta 0 = (V2-V20)/V20 = (Ih-Ih0)/Ih0 = Ih/Ih0 - 1 \tag{3}$$

The above equation 3 can be represented as follows, by using the heating quantity Qt and the electrical resistance Rh.

$$\delta 0 = \sqrt{(Qt0/Qt)(Rh/Rh0)} - 1 \tag{4}$$

The value δ can be represented by the following equation, based on V2.

$$\delta = 1 - \sqrt{(Qt0/Qt)(Rh/Rh0)} - 1 \tag{5}$$

It is assumed that R1, R7 and R8, respectively, have a constant resistance and Rc is the value of the electrical resistance of the temperature compensating resistor.

$$Rh=(R1/R7)\times(Rc+R8) \quad (6)$$

Further, it is assumed that Rc0 is the value of the electrical resistance of the temperature compensating resistor at 0° C.

$$Rc=Rc0\times(1+\kappa Tce) \quad (7)$$

Where, κ is the coefficient of temperature of the electric resistor, such as a platinum film or a platinum wire, the material of the heating resistor. Tce is the temperature of the temperature compensating resistor and is equal to or proportional to the intake air temperature Ta in the bridge circuit of FIG. 8.

Rh is set to the value of the electrical resistance proportional to the intake air temperature by such a bridge circuit. When the temperature of the air flow to be measured is changed, for example, when the air temperature is increased from the standard temperature, the value of Rh/Rh0 becomes a value greater than 1. At this time, the ratio Qt/Qt0 of the total heating quantity changes. If the value of Rh/Rh0 is not affected by the flow velocity, it is possible to bring δ0 or δ to 0.

The total heating quantity Qt is affected by the radiation quantity Qa to air in the element body and the heat transfer quantity Q1 to the lead. Generally, the heat transfer quantity Q1 to the lead, the temperature level of which varies according to the flow velocity, and the radiation quantity Qa to air in the element body, the temperature level of which is maintained approximately constant, have different characteristics with respect to the variations due to variation of the intake air temperature, respectively. Therefore, the variation of the ratio of the whole heating quantity Qt0 (=Q10+Qa0) due to the variation of the flow velocity at the standard temperature and the whole heating quantity Qt at an intake air temperature different from the standard temperature is not constant, as is Qt(80)/Qt(25) shown in FIG. 13. Therefore, by lessening the variation of the treat transfer quantity Q1 due to the variation of the temperature of the lead wire and the variation of the sum of them with respect to the flow velocity, it becomes possible to maintain Qt(80)/Qt(25) or Qt/Qt0 constant regardless of the flow velocity. As a result, as shown in FIG. 4, it is possible to set δ or δ0 approximately to 0 by using the bridge circuit shown in FIG. 8.

In order to lessen the variation of the heat transfer quantity Q1 due to the variation of the temperature of the lead wire, it is effective to use a lead wire (ex. titanium wire or tantalum wire) formed by a material in which the variation of the thermal conductivity due to temperature is relatively small. By using such a material, as shown by the dotted line in FIG. 14, the difference δδ between the ratio Q1(80)/Qt(25) of the heat transfer quantify Q1(80) to the lead and the whole heating quantity Qt(25) at a high flow velocity and the ratio Q1(80)/Qt(25) at a low flow velocity can be decreased even if the temperature The of the heating element is raised more than that of the prior art. At this time, the rate of increase of the extent ΔTe of heating provided to the heating resistor 1 is set to a value larger than the rate of flow velocity compared with the prior art in which platinum-iridium is used as the lead material, as shown by the dotted line in FIG. 5. As a result, as shown by the dotted line in FIG. 6, it becomes possible to lessen the variation of the value δ in a wide range of temperatures, for example, −30° C. to 80° C., as compared with the prior art.

Figure 15:
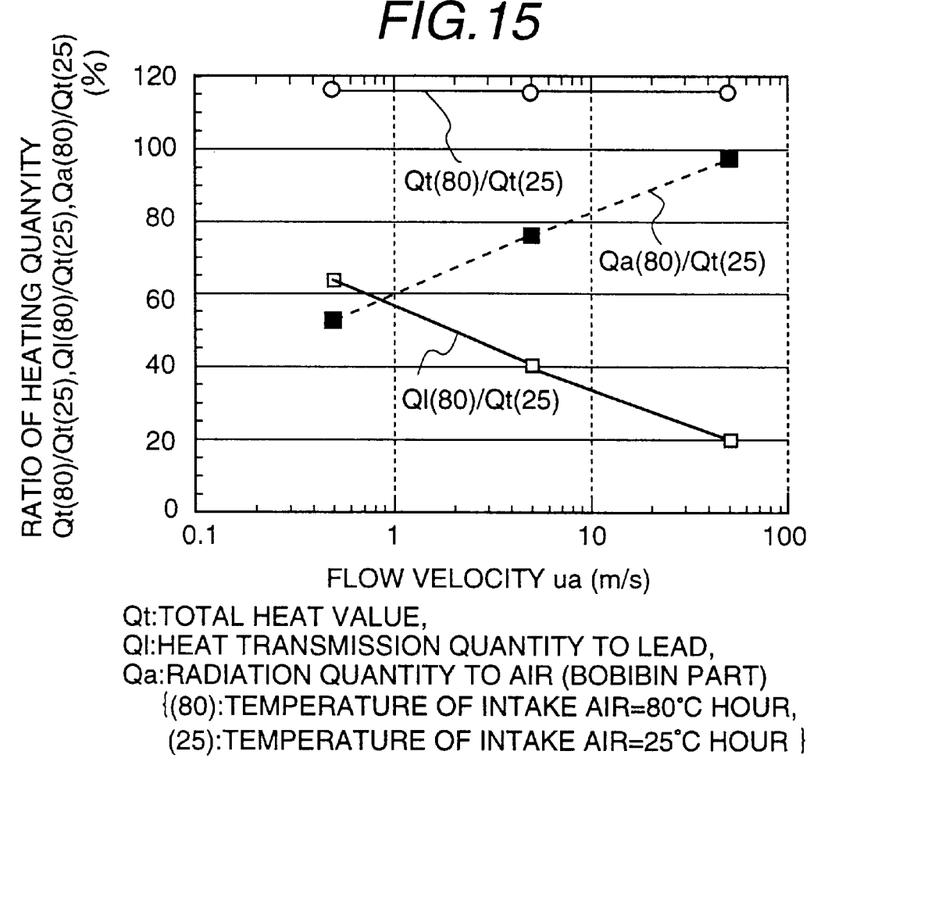
FIG. 15 is a numerical value graph showing variation of the ratio of the heating quantity and variation of the flow velocity at different intake air temperature in the thermal type flow meter according to the present invention.

The operation and effects of the present invention, as described above, will be further explained in detail with reference to FIGS. 14 and 15, on the basis of experimental and calculated results on a lead using titanium (Ti). FIG. 14 is a numerical value graph showing a variation of the difference between the ratio of the heating quantity at different intake air temperatures and a variation of the temperature of the heating element with respect to the variation of the flow velocity, in thermal type flow meters according to the present invention and the prior art. FIG. 15 is a numerical value graph showing a variation of the ratio of the heating quantity and a variation of the flow velocity at different intake air temperatures in the thermal type flow meter according the present invention.

In FIG. 14, the difference δδ between the ratio of the heat transfer quantity Q1(80) to the lead at 80° C. and the whole heating quantity Qt(25) at 25° C. standard is considered at the flow velocities of 50 m/s, 5 m/s, and 0.5 m/s. Both the thermal type flow meter of the prior art, shown by the solid line, which uses platinum-iridium as a lead wire, and the thermal type flow meter of the present invention, shown by the dotted line, which uses titanium (Ti) as a lead wire, become larger in value as the flow velocity become smaller. While, in the thermal type flow meter of the present invention, as compared with the prior art, the temperature The(80) of the heating resistor at 80° C. is high, the difference δδ is low. It is seen that the lead using Ti according to the present invention has a smaller rate of increase of the heat transfer quantity Q1 to the lead than that according to the prior art, with respect to the increase of the temperature of the lead wire due to a decrease of the flow velocity.

As shown in FIG. 15, in the thermal type flow meter of the present invention, the ratio of the heat transfer quantity Qa(80) due to the compulsive convection from the element body to air and the whole heating quantity Qt(25) at the standard temperature of 25° C. is approximately symmetrical to the ratio of the heat transfer quantity Q1(80) and the whole heating quantity Qt(25), except that the inclinations are inverted with respect to each other. For the ratio Qt(80)/Qt(25) of the sum of them, the whole heating quantity does not have a dependence on the flow velocity due to a variation of the intake air temperature. In other words, by lessening the variation of the heat transfer quantity Q1 to the lead due to the variation of the temperature of the lead, it becomes possible to decrease the error which depends upon the flow velocity when the intake air temperature of the thermal type flow meter is varied.

Figure 17:
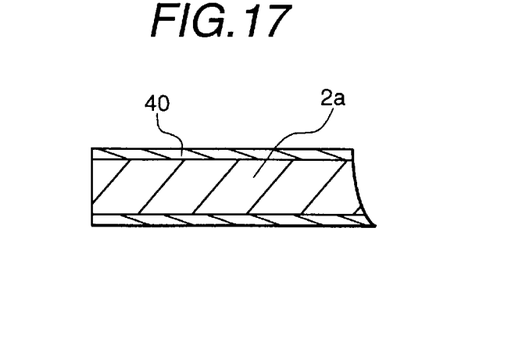
FIG. 17 is a sectional view of a lead wire of the measurement element in the thermal type flow meter according to the present invention.

FIG. 17 is a sectional view of a lead wire of the measurement element in the thermal type flow meter according to the present invention. The titanium and tantalum lead wire according to an embodiment of the present invention is formed by baking a glass adhesive and coated glass at a low temperature less than 500° C. and less than that of the prior art. This is because these materials are oxidized at more than the above temperature. If it is necessary to perform the baking at a higher temperature for the actual purpose, it is possible to use a member whose surface is coated in advance with an anti-oxidation film, as shown in FIG. 17. The coefficient of temperature of the thermal conductivity of the material for coating must be similar to that of titanium or tantalum. One may use a binary alloy of which the main component is a noble metal, such as platinum or palladium, as the material for forming the anti-oxidation film 40.

In some cases, the combination or alloy of noble metal may indicate new physical properties. Namely, an alloy of noble metal whose oxidization is slow or does not occur at all may be developed in the future. Therefore, it is possible to use an alloy of Pt—Pd or Pt—Rh as a lead, if one is developed.

Figure 18:
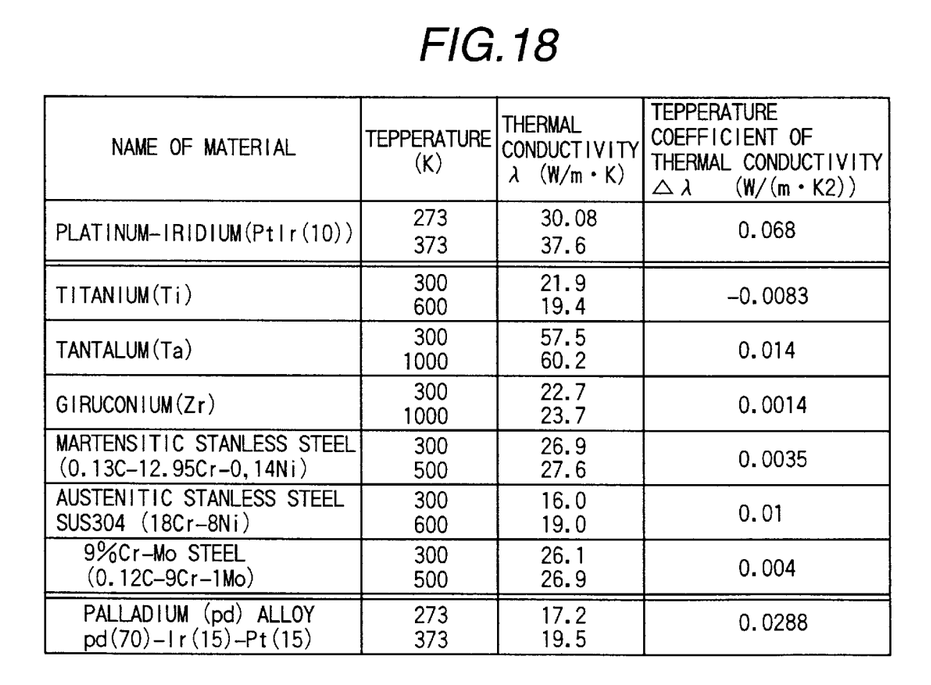
FIG. 18 is a table showing the thermal conductivity and the coefficient of temperature of a lead wire or a terminal and anti-oxidation film used in the thermal type flow meter according to the present invention and the prior art.

The material used as the support member or the anti-oxidation film 40 in the thermal type flow meter of the present invention will be explained with reference to FIG. 18. FIG. 18 is a table showing the thermal conductivity and the coefficient of temperature of a lead wire or a terminal and anti-oxidation film used in thermal type flow meter according to the present invention and the prior art.

The thermal conductivities $\lambda$ of titanium and tantalum shown as an example of the lead wire material are 21.9 W/m·K and 57.5 W/m·K, respectively, and the coefficients $\Delta\lambda$ of temperature of the thermal conductivities are $-0.008$ W/m·K$^2$ and $+0.004$ W/m·K$^2$. Namely, both physical properties are different by more than two times in the value of the thermal conductivity. Further, the signs of the coefficient of temperature of the thermal conductivity are inverted with respect to each other. Therefore, the inclination of the coefficient of temperature is inverted with respect to the variation of temperature. However, the effect, wherein the variation of the value $\delta$ is decreased, is the same.

By using a material in which the coefficient $\delta\lambda$ of thermal conductivity has a negative value as a lead wire, it is possible to produce a positive error even when the temperature of the air is low ($-30°$ C.) and the flow quantity is low. When fuel is over-supplied due to an error, in a certain type of engine, this is an advantage, for example, in that the starting characteristic of the engine may be improved at a low temperature. On the other hand, because the starting characteristic of the engine is originally better at a high temperature, it is possible to make the lean fuel and thus improve the fuel consumption or eliminate the harmful components of an exhaust gas.

As shown in FIG. 18, it is desirable to use zirconium (Zr), martensitic stainless steel and 9% Cr—Mo steel, rather than Ti, Ta, as the lead material. The austenitic stainless steer indicating $\Delta\lambda=+0.01$ W/m·K$^2$ or another material indicating $\Delta\lambda=+0.015$ W/m·K$^2$ also may be useful as the lead material. It is possible to use the above-mentioned member, having a surface coated with an anti-oxidation film as the support member. A noble metal in the platinum system and an alloy, the main component of which is platinum, are suitable for the anti-oxidation film. Further, palladium and an alloy, the main component of which is palladium, are also suitable, because the coefficient $\Delta\lambda$ of thermal conductivity are small. Furthermore, by using such a member, it become possible to decrease the production cost. As an example of such an alloy, there is a ternally alloy which consists of Pd(70)—Ir(15)—Pt(15) shown in FIG. 18. The coefficient $\Delta\lambda$ of temperature of the thermal conductivity is $+0.0288$ W/m·K$^2$, which is less than half, as compared with the alloy whose main component is platinum, ex. PtIr(10). By using this alloy, it becomes possible to join the lead to the heating resistor by an adhesive and to prevent the occurrence of deterioration of the characteristic on the coefficient $\Delta\lambda$ of temperature of the thermal conductivity of the core of a lead by coating the surface of the lead with the anti-oxidation film.

The above-mentioned material is also useful for a terminal member. Further, a lead wire formed by a material having a coefficient $\Delta\lambda$ of thermal conductivity which is small is also applicable to a lead wire for supporting the temperature compensating resistor 5. By using such a configuration, it becomes possible to decrease the variation of the thermal quantity shifted to the temperature compensating resistor when the temperature of the body is varied.

As a result, it becomes possible to decrease the error of a so-called wall temperature. It is therefore possible to improve the accuracy of the temperature compensation, and thus decrease the error of the output of the thermal type flow meter.

According to the configuration of the present invention, it is possible to decrease not only an error in the intake air temperature, but also an error in the variation of the temperature of the thermal type flow meter body.

What is claimed is:

1. A thermal type flow meter comprising: a first electric resistor, provided within a fluid to be measured, for detecting a flow quantity of said fluid, and a second electric resistor provided within the fluid, the resistance value of which depends on the measured fluid temperature, whereby temperature compensation corresponding to a variation of the measured fluid temperature is carried out by heating said first electric resistor in accordance with the measured fluid temperature detected by said second electric resistor; wherein, the value $\delta$, determined by the following relationship between the total heat value Qt0 and the value Rh0 of electric resistance of said first electric resistor at a predetermined temperature or reference temperature and the total heat value Qt and the value Rh of electric resistance of said first electric resistor at the measured fluid temperature, is within the range of $-0.003$ to $0.003$ at measured fluid temperatures between $-30°$ C. and $80°$ C.

$$\delta = 1 - \sqrt{(Qt0/Qt)(Rh/Rh0)}.$$

2. A thermal type flow meter comprising: a first electric resistor, provided within a fluid to be measured, for detecting a quantity of flow of said fluid, a second electric resistor provided within the fluid, the resistance value of which depends on the measured fluid temperature, and a support member extending from a member containing an electric conductor connected to an electric circuit, whereby temperature compensation corresponding to variation of the measured fluid temperature is carried out by heating said first electric resistor in accordance with the measured fluid temperature detected by said second electric resistor; wherein, said support member includes a lead and a terminal, and the lead is formed by material of which the temperature coefficient $\Delta\lambda$ of thermal conductivity is between $-0.06$ and $0.06$ W/m·K$^2$.

3. A thermal type flow meter according to claim 2, wherein said support member is formed by an alloy including as a component one of platinum and palladium.

4. A thermal type flow meter according to claim 2, wherein said support member is formed by one of titanium, tantalum, ziruconium, an alloy including one of them, stainless steel and Cr—Mo steel.

5. A thermal type flow meter according to one of claims 1 to 4, wherein at least one portion of the surface of said support member is coated with an anti-oxidation film.

6. A thermal type flow meter according to claim 5, wherein at least one portion of the surface of said support member is coated with one of platinum, platinum alloy, palladium and palladium alloy.

7. A thermal type flow meter according to claim 1, wherein said value of $\delta$ indicates a negative inclination with respect to the variation of the measured fluid temperature.

* * * * *